US010769256B2

(12) United States Patent
Han et al.

(10) Patent No.: US 10,769,256 B2
(45) Date of Patent: *Sep. 8, 2020

(54) METHODS AND APPARATUSES FOR ADAPTIVELY UPDATING ENROLLMENT DATABASE FOR USER AUTHENTICATION

(71) Applicant: Samsung Electronics Co., Ltd., Suwon-si, Gyeonggi-do (KR)

(72) Inventors: Jaejoon Han, Seoul (KR); Jungbae Kim, Seoul (KR); Seon Min Rhee, Seoul (KR); Seungju Han, Seoul (KR); Minsu Ko, Suwon-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 174 days.

This patent is subject to a terminal disclaimer.

(21) Appl. No.: 15/469,984

(22) Filed: Mar. 27, 2017

(65) Prior Publication Data

US 2017/0199996 A1 Jul. 13, 2017

Related U.S. Application Data

(63) Continuation-in-part of application No. 15/270,172, filed on Sep. 20, 2016.

(30) Foreign Application Priority Data

Nov. 11, 2015 (KR) .................. 10-2015-0158148
Mar. 8, 2016 (KR) .................. 10-2016-0027745

(51) Int. Cl.
*G06F 21/00* (2013.01)
*G06F 21/32* (2013.01)
(Continued)

(52) U.S. Cl.
CPC .............. *G06F 21/32* (2013.01); *G06F 16/23* (2019.01); *G06F 16/51* (2019.01); *G06F 21/36* (2013.01);
(Continued)

(58) Field of Classification Search
None
See application file for complete search history.

(56) References Cited

U.S. PATENT DOCUMENTS 7,646,909 B2   1/2010 Jiang et al.
8,312,291 B2 * 11/2012 Golic ................ G06K 9/00288
                                                              382/115
(Continued)

FOREIGN PATENT DOCUMENTS

EP       2874098 A1    5/2015
JP     2004302644 A   10/2004
(Continued)

OTHER PUBLICATIONS

U.S. Office Action for corresponding U.S. Appl. No. 15/270,172 dated Nov. 13, 2018.
(Continued)

*Primary Examiner* — Ghazal B Shehni
(74) *Attorney, Agent, or Firm* — Harness, Dickey & Pierce, P.L.C.

(57) ABSTRACT

An adaptive updating method of an enrollment database is disclosed. The method may include extracting a first feature vector from an input image of a user, determining whether the input image is to be enrolled in an enrollment database based on the first feature vector, second feature vectors of enrollment images including initial enrollment images enrolled in the enrollment database, and a representative
(Continued)

vector representing the initial enrollment images, and enrolling the input image in the enrollment database based on a result of the determining.

30 Claims, 9 Drawing Sheets

(51) Int. Cl.
| | |
|---|---|
| *G06F 16/23* | (2019.01) |
| *G06F 16/51* | (2019.01) |
| *G06K 9/00* | (2006.01) |
| *G06K 9/62* | (2006.01) |
| *G07C 9/37* | (2020.01) |
| *G06F 21/45* | (2013.01) |
| *G06F 21/36* | (2013.01) |
| *G06K 9/46* | (2006.01) |
| *H04L 29/06* | (2006.01) |

(52) U.S. Cl.
CPC ......... *G06F 21/45* (2013.01); *G06K 9/00026* (2013.01); *G06K 9/00087* (2013.01); *G06K 9/00228* (2013.01); *G06K 9/00275* (2013.01); *G06K 9/00288* (2013.01); *G06K 9/00302* (2013.01); *G06K 9/00892* (2013.01); *G06K 9/00926* (2013.01); *G06K 9/4671* (2013.01); *G06K 9/6255* (2013.01); *G07C 9/37* (2020.01); *H04L 63/0861* (2013.01)

(56) References Cited

U.S. PATENT DOCUMENTS

| 9,530,052 | B1* | 12/2016 | Pillai | G06K 9/00617 |
|---|---|---|---|---|
| 2011/0135165 | A1 | 6/2011 | Wechsler et al. | |
| 2012/0294496 | A1 | 11/2012 | Nakamoto | |
| 2013/0051632 | A1 | 2/2013 | Tsai et al. | |
| 2013/0318351 | A1* | 11/2013 | Hirano | H04L 9/3073 |
| | | | | 713/168 |
| 2013/0343616 | A1 | 12/2013 | Forero et al. | |
| 2014/0185794 | A1* | 7/2014 | Yasuda | H04L 9/008 |
| | | | | 380/28 |
| 2015/0092996 | A1* | 4/2015 | Tian | G06K 9/00281 |
| | | | | 382/118 |
| 2017/0132458 | A1 | 5/2017 | Short et al. | |

FOREIGN PATENT DOCUMENTS

| JP | 2009258990 A | 11/2009 |
|---|---|---|
| JP | 2013077068 A | 4/2013 |
| JP | 2014002506 A | 1/2014 |
| KR | 20080097798 A | 11/2008 |
| KR | 101180471 B1 | 9/2012 |
| WO | WO-2011140605 A1 | 11/2011 |

OTHER PUBLICATIONS

Extended European Search Report dated Mar. 28, 2017.
U.S. Office Action for corresponding U.S. Appl. No. 15/270,172 dated Apr. 4, 2018.
U.S. Office Action dated Jul. 5, 2019 issued in co-pending U.S. Appl. No. 15/270,172.
U.S. Office Action for corresponding U.S. Appl. No. 15/270,172 dated Nov. 4, 2019.
U.S. Notice of Allowance for corresponding U.S. Appl. No. 15/270,172 dated Jan. 31, 2020.
U.S. Notice of Allowance for corresponding U.S. Appl. No. 15/270,172 dated May 7, 2020.

* cited by examiner

METHODS AND APPARATUSES FOR ADAPTIVELY UPDATING ENROLLMENT DATABASE FOR USER AUTHENTICATION

CROSS-REFERENCE TO RELATED APPLICATION

This application claims priority under 35 U.S.C. §§ 120, 121 to and is a continuation-in-part of U.S. application Ser. No. 15/270,172, filed on Sep. 20, 2016, which claims priority under 35 U.S.C. § 119 to Korean Patent Application No. 10-2015-0158148, filed on Nov. 11, 2015, and Korean Patent Application No. 10-2016-0027745, filed on Mar. 8, 2016, at the Korean Intellectual Property Office, the entire contents each of which are incorporated herein by reference in its entirety.

BACKGROUND

1. Field

At least one example embodiment relates to an adaptive updating method and apparatus of an enrollment database for user authentication.

2. Description of the Related Art

Various mobile devices such as a smartphone and wearable devices may use biometric information of a user, for example, a fingerprint, an iris, a face, voice, and blood vessels in security authentication. Since face recognition has a number of change elements according to time, for example, in a makeup style, a hair style, a beard, and a weight of a user, the face recognition may have an issue of performing authentication by comparing an initial enrollment image to a face image to be input.

SUMMARY

At least one example embodiment relates to an adaptive updating method of an enrollment database.

In at least one example embodiment, the method may include extracting a first feature vector from an input image of a user, determining whether the input image is to be enrolled in an enrollment database based on the first feature vector, second feature vectors of enrollment images including initial enrollment images enrolled in the enrollment database, and a representative vector representing the initial enrollment images, and enrolling the input image in the enrollment database based on a result of the determining.

The determining of whether the input image is to be enrolled may include at least one of determining whether the input image is an outlier based on the first feature vector, the second feature vectors, and the representative vector, and determining whether a feature range of the enrollment database is extended based on the first feature vector and the second feature vectors.

The determining of whether the input image is the outlier may include calculating a minimum distance between the first feature vector and the second feature vectors, calculating a representative distance between the first feature vector and the representative vector, and determining whether the input image is the outlier based on the minimum distance and the representative distance.

The determining of whether the input image is the outlier may include determining whether the input image is the outlier based on whether the minimum distance is less than a first preset threshold and whether the representative distance is less than a second preset threshold, and the first preset threshold and the second preset threshold are for an update of the enrollment database.

The determining of whether the feature range of the enrollment database is extended may include determining an accumulation feature distance corresponding to each vector in a vector set including the first feature vector and the second feature vectors, the accumulation feature distance determined based on distances between a vector and remaining vectors in the vector set, and determining whether an accumulation feature distance corresponding to the first feature vector is greater than at least one of accumulation feature distances corresponding to the second feature vectors of remaining enrollment images excluding the initial enrollment images.

The enrolling of the input image in the enrollment database may include replacing any one enrollment image among the remaining enrollment images with the input image when the accumulation feature distance corresponding to the first feature vector is greater than the at least one of the accumulation feature distances corresponding to the second feature vectors of the remaining enrollment images.

The replacing of the any one enrollment image with the input image may include replacing, with the input image, a remaining enrollment image corresponding to a second feature vector having a minimum accumulation feature distance among the accumulation feature distances.

The enrolling of the input image may include enrolling the input image as an initial enrollment image based on a result of determination whether the input image is an outlier, and a first comparison result between a number of the enrollment images and a number of preset initial enrollment images.

The enrolling of the input image in the enrollment database may include enrolling the input image as the initial enrollment image based on the result of the determination that the input image is not the outlier and the first comparison result that the number of the enrollment images is less than the number of the preset initial enrollment images, and determining the representative vector using the initial enrollment images based on the result of the determination that the input image is not the outlier and the first comparison result that the number of the enrollment images is equal to the number of the preset initial enrollment images.

The enrolling of the input image in the enrollment database may include at least one of, based on the result of the determination whether the input image is the outlier, the first comparison result, and a second comparison result between the number of enrollment images and a maximum enrollment number of the enrollment database, adding the input image to the enrollment database, and replacing any one of remaining enrollment images excluding the initial enrollment images included in the enrollment images with the input image.

The adding of the input image to the enrollment database may include adding the input image to the enrollment database when the input image is not the outlier, the number of the enrollment images is greater than the number of the preset initial enrollment images, and the number of the enrollment images is less than the maximum enrollment number of the enrollment database.

The replacing of the any one enrollment image with the input image may include replacing any one of the remaining enrollment images excluding the initial enrollment images included in the enrollment images with the input image when the input image is not the outlier, the number of the enrollment images is greater than the number of the preset initial enrollment images, and the number of the enrollment images is greater than or equal to the maximum enrollment number of the enrollment database.

The determining of whether the input image is to be enrolled may include authenticating the user based on the first feature vector, the second feature vectors, and the representative vector.

The authenticating of the user may include calculating a minimum distance between the first feature vector and the second feature vectors, calculating a representative distance between the first feature vector and the representative vector, and authenticating the user based on a result of a comparison of a minimum value of the minimum distance and the representative distance to a preset threshold for a user authentication.

The determining of whether the input image is to be enrolled may include determining whether the input image is to be enrolled in the enrollment database based on whether the authenticating of the user succeeds or fails.

At least one example embodiment relates to an adaptive updating apparatus of an enrollment database.

According to another example embodiment, the apparatus includes a memory configured to store an enrollment database, and a processor configured to extract a first feature vector from an input image of a user and enroll the input image by determining whether the input image is to be enrolled in the enrollment database based on the first feature vector, second vectors of enrollment images including initial enrollment images enrolled in the enrollment database, and a representative vector representing the initial enrollment images.

The processor may be configured to determine at least one of whether the input image is an outlier based on the first feature vector, the second feature vectors, and the representative vector and whether a feature range of the enrollment database is extended based on the first feature vector and the second feature vectors.

The processor may be configured to calculate a minimum distance between the first feature vector and the second feature vectors, calculate a representative distance between the first feature vector and the representative vector, and determine whether the input image is the outlier based on the minimum distance and the representative distance.

The processor may be configured to determine an accumulation feature distance corresponding to each vector in a vector set including the first feature vector and the second feature vectors, the accumulation feature distance is determined based on distances between a vector and remaining vectors in the vector set, and determine whether the feature range of the enrollment database is extended based on whether an accumulation feature distance corresponding to the first feature vector is greater than at least one of accumulation feature distances corresponding to the second feature vectors of remaining enrollment images excluding the initial enrollment images.

The processor may be configured to replace, with the input image, a remaining enrollment image corresponding to a second feature vector having a minimum accumulation feature distance among the enrollment images when the accumulation feature distance corresponding to the first feature vector is greater than the at least one of the accumulation feature distances corresponding to the second feature vectors of the remaining enrollment images, based on a result of the determining.

The processor may be configured to enroll the input image as an initial enrollment image when the input image is not an outlier and a number of the enrollment images is less than a number of preset initial enrollment images, and determine the representative vector using the initial enrollment images when the input image is not the outlier and the number of the enrollment images is equal to the number of the preset initial enrollment images.

The processor may be configured to add the input image to the enrollment database when the input image is not the outlier, the number of the enrollment images is greater than the number of the preset initial enrollment images, and the number of the enrollment images is less than a maximum enrollment number of the enrollment database, and replace any one of remaining enrollment images excluding the initial enrollment images included in the enrollment images with the input image when the input image is not the outlier, the number of the enrollment images is greater than the number of the preset initial enrollment images, and the number of the enrollment images is greater than or equal to the maximum enrollment number of the enrollment database.

The processor may be configured to authenticate the user based on the first feature vector, the second feature vectors, and the representative vector and determine whether the input image is to be enrolled in the enrollment database based on whether the authenticating of the user succeeds or fails.

At least one example embodiment relates to an adaptive updating method of an enrollment database.

According to still another example embodiment, the method includes authenticating an input image, determining whether the input image is an outlier, determining whether a feature range of an enrollment database including enrollment images is extended by the input image, and replacing any one of remaining enrollment images excluding initial enrollment images included in the enrollment images with the input image.

The determining of whether the input image is the outlier may include calculating a minimum distance between a first feature vector extracted from the input image and second feature vectors extracted from the enrollment images in the enrollment database, calculating a representative distance between the first feature vector and a representative vector representing the initial enrollment images, and determining whether a first condition associated with the minimum distance and a second condition associated with the representative distance are satisfied.

The determining of whether the feature range of the enrollment database is extended by the input image may include calculating an accumulation feature distance corresponding to each vector in a vector set including a first feature vector extracted from the input image and second feature vectors extracted from the enrollment images in the enrollment database, and determining whether an accumulation feature distance corresponding to the first feature vector is greater than at least one of accumulation feature distances corresponding to the second feature vectors of the remaining enrollment images excluding the initial enrollment images.

The calculating of the accumulation feature distance corresponding to each vector may include adding up, to correspond to each vector, distances between the vector and remaining vectors in the vector set.

At least one example embodiment relates to an adaptive updating apparatus of an enrollment database.

According to further example embodiment, the apparatus includes a processor configured to authenticate an input image based on enrollment database in which enrollment images including initial enrollment images are enrolled, determine whether the input image is an outlier based on a representative vector representing the initial enrollment images, and adaptively update the enrollment database based on a result of the authenticating and a result of the determining.

To determine whether the input image is the outlier, the processor may be configured to calculate a minimum distance between a first feature vector extracted from the input image and second feature vectors extracted from the enrollment images in the enrollment database, calculate a representative distance between the first feature vector and the representative vector, and determine whether a first condition associated with the minimum distance and a second condition associated with the representative distance are satisfied.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
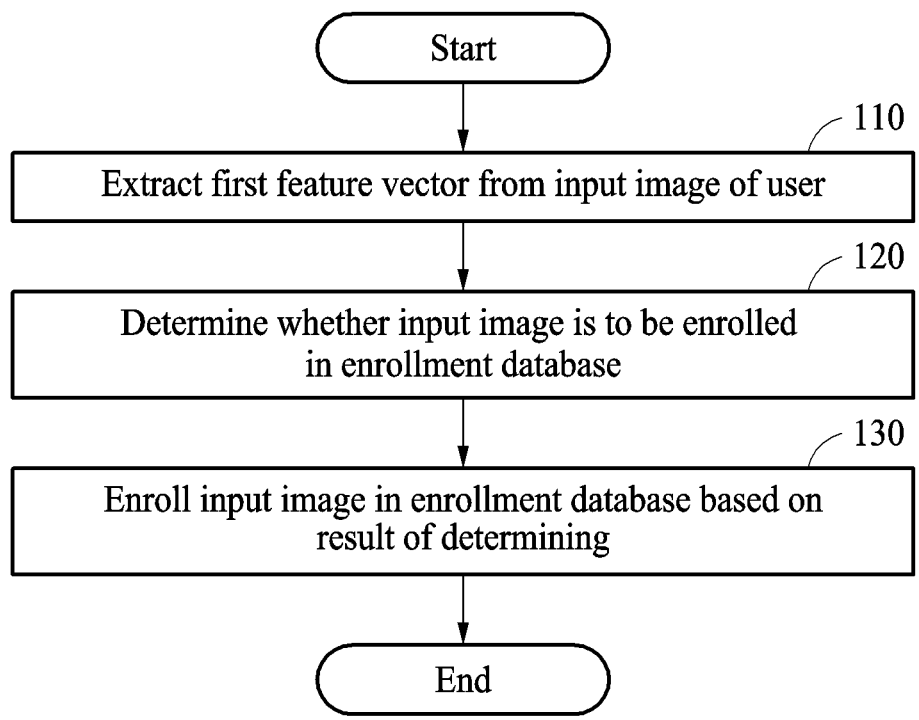
FIG. 1 is a flowchart illustrating an adaptive updating method of an enrollment database according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

Example embodiments may be used for recognizing a face of a user. An operation of recognizing the face of the user may include an operation of authenticating or identifying the user. In an example, the operation of authenticating the user may include an operation of determining whether the user is a pre-enrolled user. In this example, a result of the authenticating of the user may be output as true or false. In another example, the operation of identifying the user may include an operation of determining that the user corresponds to any one user among a plurality of pre-enrolled users. In this example, a result of the identifying of the user may be output as an identification (ID) of any one pre-enrolled user. When the user does not correspond to any one user among the plurality of pre-enrolled users, a signal notifying that the user is not identified may be output.

Example embodiments may be implemented as various types of products, for example, personal computers, laptop computers, tablet computers, smart phones, televisions, smart home appliances, intelligent vehicles, kiosks, and wearable devices. For example, the examples may be applied to authenticate a user using a smart phone, a mobile device, and a smart home system. In the same manner, the example embodiments may be applied to a payment service through user authentication. The example embodiments may be also applied to an intelligent vehicle system to automatically start a vehicle through user authentication. Hereinafter, reference will now be made in detail to examples with reference to the accompanying drawings, wherein like reference numerals refer to like elements throughout.

FIG. 1 is a flowchart illustrating an adaptive updating method of an enrollment database according to at least one example embodiment. For example, an updating apparatus for performing the adaptive updating method may be included in a user authentication apparatus or may be provided as an additional apparatus. The updating apparatus may be provided in a software module, a hardware module, or a combination thereof. The enrollment database may be referred to as an enrollment template.

Referring to FIG. 1, in operation 110, the updating apparatus extracts a first feature vector from an input image of a user. The input image may be an image including various user body portions, for example, a face, an iris, and a fingerprint of a user. The first feature vector may be understood as a vector indicating a feature for face recognition extracted from the input image. The updating apparatus may extract the first feature vector from the input image based on various schemes such as a local binary pattern (LBP) scheme, a Gabor scheme, or a deep learning scheme.

In operation 120, the updating apparatus determines whether the input image is to be enrolled in the enrollment database. For example, the updating apparatus may perform authentication of the input image, determine whether the input image is an outlier, and determine whether the input image is to be enrolled in the enrollment database.

The updating apparatus may use a first feature vector, second feature vectors, and a representative vector. A second feature vector(s) may be understood as a vector(s) indicating a feature for the face recognition extracted from an enrollment image(s) enrolled in an enrollment database. The enrollment images may include initial enrollment images. The second feature vector(s) may be extracted based on the LBP scheme, the Gabor scheme, and the deep learning scheme.

The representative vector may be a vector representing the initial enrollment images, and any one of the initial enrollment images may be determined as the representative vector.

The representative vector may indicate a feature of an initial enrollment image which is closest to statistical calculation, for example, an average and a standard deviation, of values of the second feature vectors corresponding to the initial enrollment images.

After the initial enrollment images corresponding to a number, for example, seven, of preset initial enrollment images are enrolled, distances from the initial enrollment images and an average feature value of seven initial enrollment images may be calculated using Equation 1, and then the representative vector may be determined based on a feature vector of an initial enrollment image corresponding to a feature closest to the average feature value by aligning the calculated distances.

An average feature vector $\bar{x}$ of second feature vectors corresponding to initial enrollment images $X_1, X_2, \ldots, X_{init}$ may be expressed, for examples, as shown in Equation 1.

$$x_i = f(X_i) \text{ for } i = 1, \ldots, n \qquad \text{[Equation 1]}$$

$$\bar{x} = \frac{1}{N} \sum_{1}^{N_{init}} x_i$$

In Equation 1, $N_{init}$ denotes a number of preset initial enrollment images. For example, $N_{init}$ may be greater than 1, such as 2, 3, 6, and 7. However, $N_{init}$ is not limited thereto.

Alternatively, the representative vector may be determined based on a feature vector of an initial enrollment image corresponding to an intermediate value obtained based on a result of aligning distances calculated from an average feature vector of initial enrollment images. Also, the representative vector may be determined by an initial enrollment image that is firstly enrolled in the enrollment database among the initial enrollment images, or may be determined based on statistical calculation, for example, a standard deviation, of feature vectors of the initial enrollment images.

The representative vector is not limited thereto, and may be determined based on a combination of the above-described methods and other various methods.

The updating apparatus may perform the authentication of the input image based on the first feature vector, the second feature vectors, and the representative vector. In an example, the updating apparatus may perform the authentication of the input image by comparing vectors in a set of {second feature vectors and a representative vector} to the first feature vector.

The updating apparatus may calculate a minimum distance between the first feature vector and the vectors in the set of {the second feature vectors and the representative vector}. A distance between the first feature vector and the vectors in the set of {the second feature vectors and the representative vector} may be understood as, for example, a Euclidean distance in inverse proportion to a similarity among feature vectors. The updating apparatus may calculate a minimum distance $d_n$, using Equation 2.

$$d_n = \min\{d(x_1,y), \ldots, d(x_n,y), d(\tilde{x},y)\} \qquad \text{[Equation 2]}$$

In Equation 2, y denotes a first feature vector, $x_1$ through $x_n$ denote second feature vectors, $\tilde{x}$ denotes a representative vector, and $d_n$ denotes a minimum distance between the first feature vector and the vectors in the set of {the second feature vectors and the representative vector}.

When the minimum distance $d_n$, is less than a first threshold distance, the updating apparatus may determine that the authentication of the input image succeeds. The first threshold distance may be predetermined as a distance corresponding to 1% of a false acceptance rate (FAR). The FAR may be a rate of falsely recognizing another user as a user.

The updating apparatus may authenticate the input image based on a similarity instead of a distance. In this example, the updating apparatus may calculate a maximum similarity between the first feature vector and the vectors in the set of {the second feature vectors and the representative vector}. When the maximum similarity is greater than a first threshold similarity, the updating apparatus may determine that the authentication of the input image succeeds. The first threshold similarity may be predetermined as a similarity corresponding to an FAR of 1%.

In another example, the updating apparatus may determine whether the authentication of the input image succeeds or fails by comparing the first feature vector to the second feature vectors.

Even when the authentication of the input image succeeds, the input image may be actually falsely accepted. For example, even though the input image corresponds to a user in an authenticating process based on a result of the determination, the input image may actually correspond to an image of another user. To prevent the falsely accepted input image from being enrolled in the enrollment database, the updating apparatus may determine whether the input image is to be enrolled in the enrollment database based on a second condition which is stricter than a first condition for the authentication. The second condition may be a condition that determines whether the input image is the outlier.

In this example, the outlier may be understood as an image corresponding to another user other than a user even when the authentication succeeds.

The updating apparatus may determine whether the input image is the outlier based on the first feature vector, the second feature vectors, and the representative vector. For example, the updating apparatus may examine two conditions. Firstly, the updating apparatus may examine whether a minimum distance between the first feature vector and the second feature vectors is less than a predetermined second threshold distance. In this example, the second threshold distance may be determined to be stricter than a first threshold distance for the authentication of the input image. For example, the second threshold distance may be a distance corresponding to an FAR of 0.01%. Secondly, the updating apparatus may examine whether a distance between the first feature vector and the representative vector is less than a predetermined third threshold distance. The third threshold distance may be determined to be identical to the second threshold distance, or determined to be different from the second threshold distance.

For example, the updating apparatus may use the similarity instead of the distance. In this example, the updating apparatus may examine whether a maximum similarity between the first feature vector and the second feature vectors is greater than a predetermined second threshold similarity. The second threshold similarity may be, for example, a similarity corresponding to the FAR of 0.01%. The updating apparatus may examine whether a similarity between the first feature vector and the representative vector is greater than a predetermined third threshold similarity.

The updating apparatus may determine that the input image is not the outlier when the two aforementioned conditions are satisfied. When the input image is not the outlier, the updating apparatus may determine that the input image is to be enrolled in the enrollment database. When the input image is the outlier, the updating apparatus may determine that the input image is not to be enrolled in the enrollment database.

Based on a result of the determining that the input image is to be enrolled in the enrollment database, the updating apparatus enrolls the input image in the enrollment database in operation 130. Here, to enroll may be understood as to enroll the input image as the initial enrollment image in the enrollment database, to add the input image to the enrollment database, and to replace the input image with any one of remaining enrollment images excluding the initial enrollment images included in the enrollment images in the enrollment database.

In an example, when a number of the enrollment images included in the enrollment database is less than a number, for example, seven, of the preset initial enrollment images, the updating apparatus may enroll the input image as the initial enrollment image. When the number of the enrollment images is equal to the number of the preset initial enrollment images, the updating apparatus may determine the representative vector using the initial enrollment images.

When the number of the enrollment images included in the enrollment database is greater than the number of the preset initial enrollment images and less than a predetermined threshold number (or maximum enrollment number), the updating apparatus may add the input image to the enrollment database. The maximum enrollment number may be, for example, 10, 20, or 30.

In another example, when the number of the enrollment images included in the enrollment database is equal to the threshold number, the updating apparatus may replace the input image with any one of the enrollment images based on whether a feature range of the enrollment database is extended by the input image. In this example, extending of the feature range of the enrollment database may be understood as varying face changes of the user recognized based on the enrollment images included in the enrollment database. The face changes of the user may be caused by various elements, for example, a makeup style, a hair style, a beard, and a weight.

The updating apparatus may determine whether the feature range of the enrollment database is extended based on the first feature vector and the second feature vectors. A method of determining whether a feature range of an enrollment database is extended will be described with reference to FIG. 6.

Figure 2C:
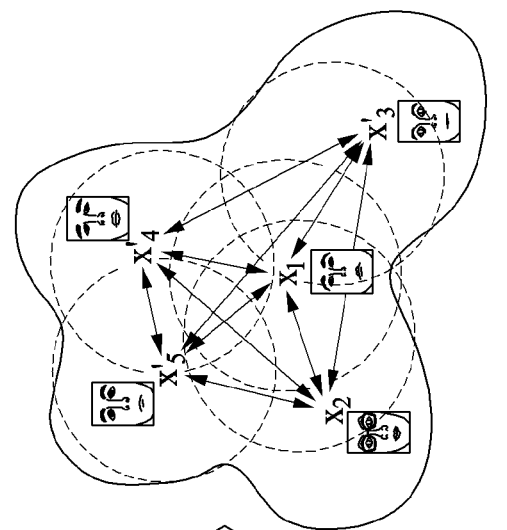
FIGS. 2A through 2C illustrate a method of increasing a user authentication rate by an adaptive update of an enrollment database according to at least one example embodiment.
Figure 2B:
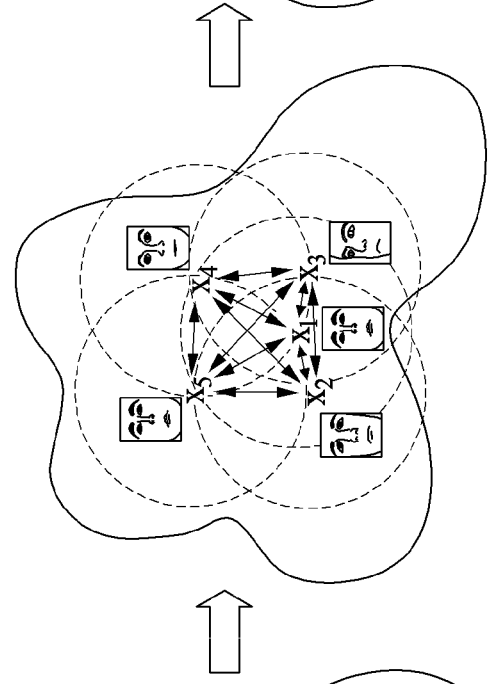
Figure 2A:
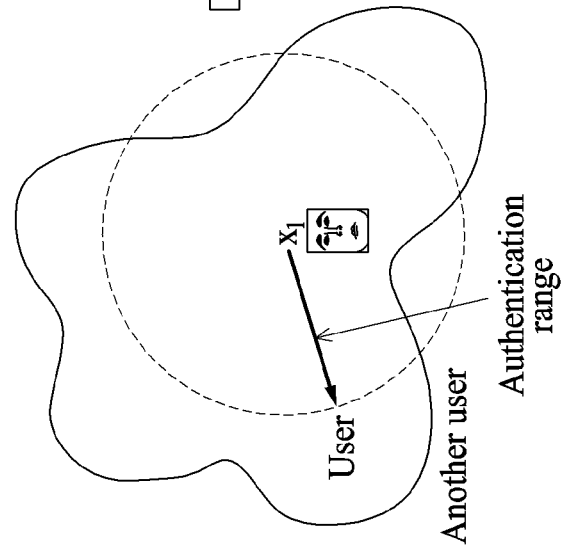

An updating apparatus may prevent an image corresponding to another user from being enrolled in an enrollment database, and adaptively update the enrollment database such that various images corresponding to a user are included in the enrollment database. A user authentication rate may be enhanced based on the adaptively updated enrollment database. FIGS. 2A through 2C illustrate a method of increasing a user authentication rate by an adaptive update of an enrollment database according to at least one example embodiment. Referring to FIGS. 2A through 2C, when the enrollment images in the enrollment database are adaptively added or replaced, an authentication range by the enrollment images in the enrollment database may be improved to effectively cover a range corresponding to a user. Each circle illustrated in a radial form from each enrollment image represents an authentication range by a corresponding enrollment image.

Referring to FIG. 2A, an authentication range by an enrollment image $X_1$ when the enrollment image $X_1$ is enrolled in the enrollment database is illustrated. As described above, since a face has various change elements, for example, in a lighting, a makeup style, a hair style, a beard, and a weight, a single enrollment image may not effectively cover an authentication range corresponding to a user. Thus, a recognition rate, for example, a verification rate (VR), may be low and a false rejection rate (FRR) may be great. The recognition rate may be a rate of appropriately recognizing the user, and the FRR may be a rate of falsely rejecting the user. Although not illustrated in drawings, an authentication range of the enrollment image $X_1$ may need to be extended to a range in which another user is misrecognized as the user, in order to entirely cover a range corresponding to the user only with the enrollment image $X_1$. In this example, the FAR may be seriously increased.

Referring to FIG. 2B, an authentication range when a plurality of enrollment images $X_1$, $X_2$, $X_3$, $X_4$, and $X_5$ are included in the enrollment database is illustrated. When the enrollment images $X_2$, $X_3$, $X_4$, and $X_5$ are included in the enrollment database, a recognition rate may increase when compared to when the one enrollment image $X_1$ is enrolled in the enrollment database.

In an example, a false acceptance rate (FAR) may be decreased by setting an authentication range of an individual enrollment image not to be extended excessively, while increasing the recognition rate using features, for example, second feature vectors, of a plurality of enrollment images including the initial enrollment images and the representative vector representing the initial enrollment images.

Referring to FIG. 2C, an authentication range when the remaining enrollment images $X_3$, $X_4$, and $X_5$ excluding the initial enrollment images $X_1$, and $X_2$ are replaced with enrollment images $X'_3$, $X'_4$, and $X'_5$ in the enrollment database is illustrated. Here, the replaced enrollment images $X'_3$, $X'_4$, and $X'_5$ may enable a range corresponding to the user to be widespread such that a recognition rate with respect to variously changing face of the user may increase. Also, the initial enrollment images $X_1$ and $X_2$ may prevent the range corresponding to the user from being continuously extended due to replacement of the enrollment images. Thus, the range corresponding to the user may not be extended to a recognition range of another user. That is, the initial enrollment images may prevent the range corresponding to another user from being extended to the range corresponding to another user even when the range corresponding to the user is widespread.

In an example, remaining enrollment images excluding the initial enrollment images $X_1$, and $X_2$ may be continuously replaced to maintain distances between the enrollment images enrolled in an enrollment database to be wide, such that the recognition rate increases thereby increasing the ability to adapt to a face change of the user. In this example, maintaining the distances between the enrollment images to be wide may be understood as decreasing similarities between the enrollment images to allow the enrollment images to represent various changes. In this example, an outlier may be required to be excluded from the enrollment images even when the distances between the enrollment images are maintained to be maximally wide. A method of excluding an outlier from enrollment images will be described with reference to FIG. 3.

In an example, a range corresponding to a user may be effectively covered by adding and replacing the enrollment images $X_1$, $X_2$, $X_3$, $X_4$, and $X_5$ as illustrated in FIGS. 2B and 2C, thereby increasing the recognition rate with respect to an input image while decreasing the FAR and the FRR.

Figure 3A:
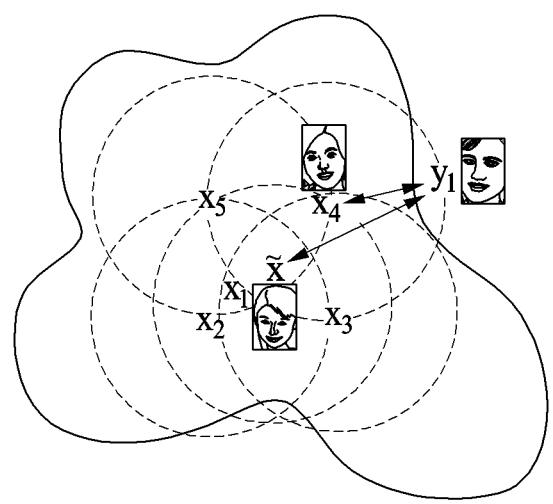
FIGS. 3A and 3B illustrate a method of determining whether an input image is an outlier according to at least one example embodiment.
Figure 3B:
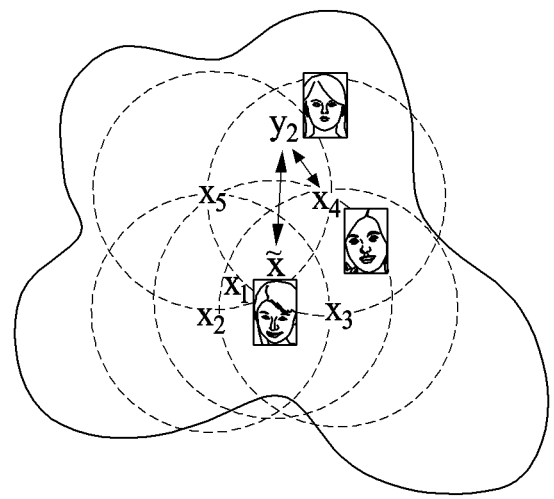

FIGS. 3A and 3B illustrate a method of determining whether an input image is an outlier according to at least one example embodiment. FIG. 3A illustrates a case in which an input image is determined to be an outlier, and FIG. 3B illustrates a case in which the input image is determined not to be the outlier. An enrollment database may include second feature vectors $x_1$, $x_2$, $x_3$, $x_4$, and $x_5$ of enrollment images including initial enrollment images and a representative vector $\tilde{x}$ representing the initial enrollment images. The representative vector $\tilde{x}$ may correspond to a feature of any one of the initial enrollment images.

Referring to FIG. 3A, a distance between a first feature vector $y_1$ of a first input image and a feature vector $x_4$ of a fourth enrollment image stored in the enrollment database is less than a predetermined second threshold distance, but a distance between the first feature vector $y_1$ and the representative vector $\tilde{x}$ of the initial enrollment images may be greater than a predetermined third threshold distance. In this example, even when the first input image is similar to the fourth enrollment image, it may be determined that the first input image is not similar to an image representing the initial enrollment images stored in the enrollment database.

Even when the input image is determined to be similar to at least one of the enrollment images stored in the enrollment database, the updating apparatus may not enroll the input image in the enrollment database when it is determined that the input image is not similar to the image representing the enrollment images. Thus, example embodiments may prevent an outlier from being included in the enrollment database.

Referring to FIG. 3B, a distance between a first feature vector $y_2$ of a second input image and the feature vector $x_4$ of the fourth enrollment image stored in the enrollment database is less than the second threshold distance, and a distance between the first feature vector $y_2$ and the representative vector $\tilde{x}$ may be less than the third threshold distance. Thus, the second input image may indicate that the second input image has a distance greater than or equal to a predetermined reference with all the enrollment images. The updating apparatus may determine that the second input image corresponding to the first feature vector $y_2$ as an image corresponding to the user, and enroll the second input image in the enrollment database.

Figure 4:
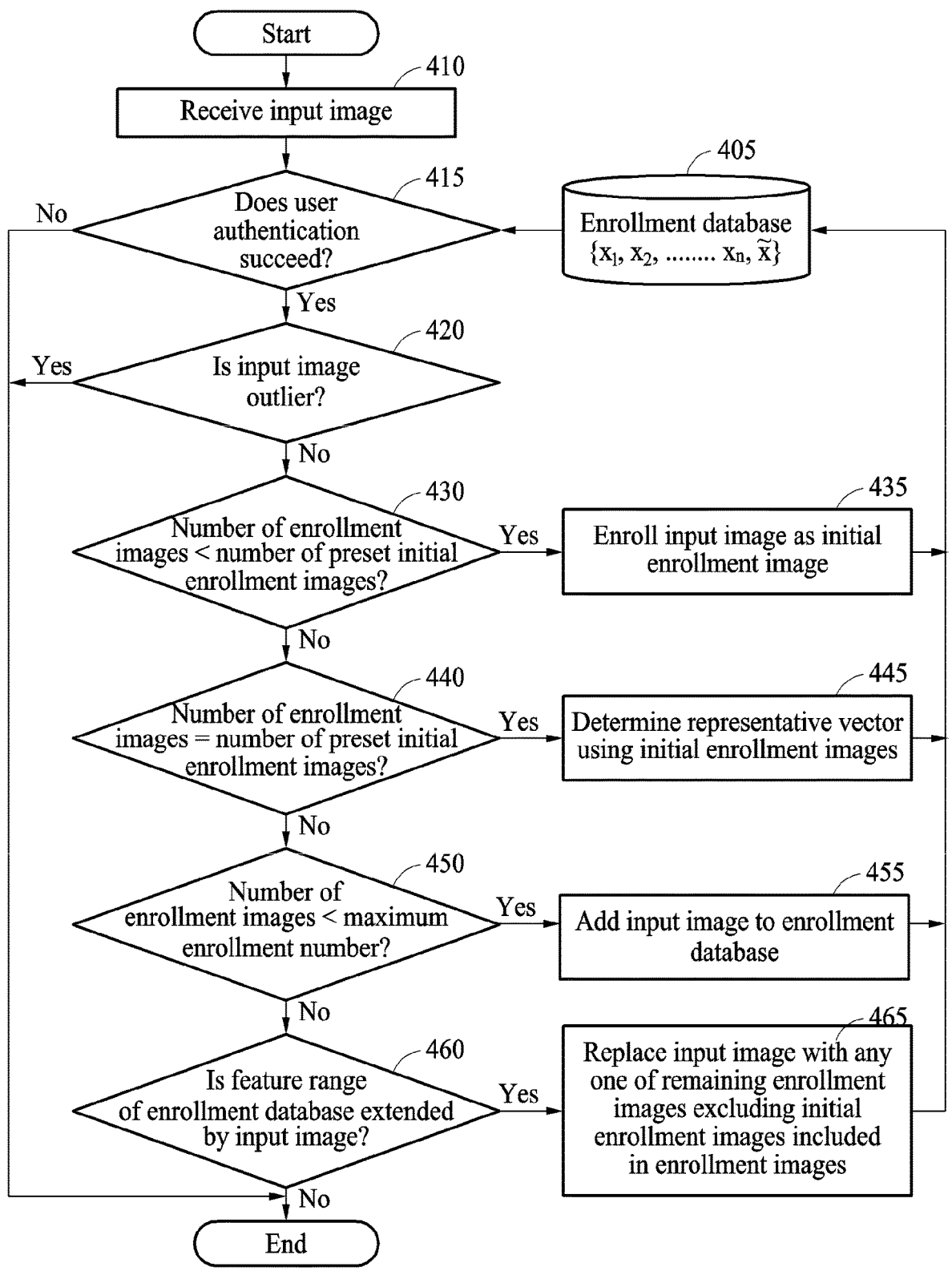
FIG. 4 is a flowchart illustrating an adaptive updating algorithm of an enrollment database according to at least one example embodiment.

FIG. 4 is a flowchart illustrating an example of an adaptive updating algorithm of an enrollment database according to at least one example embodiment. Referring to FIG. 4, in operation 410, an updating apparatus receives an input image, Y. The updating apparatus may extract a first feature vector from the input image Y. In operation 415, the updating apparatus determines whether user authentication succeeds or fails. For example, the updating apparatus may perform the user authentication using the first feature vector and an enrollment database 405. When the user authentication fails, the updating apparatus may terminate an operation without enrolling the input image Y in the enrollment database 405.

When the user authentication succeeds, the updating apparatus determines whether the input image Y is an outlier in operation 420. The updating apparatus may determine whether the input image Y is the outlier by examining the two conditions described with reference to FIG. 1.

A condition for determining whether an input image is an outlier may be variously changed. For example, the updating apparatus may determine whether the input image is the outlier using Equation 3.

$$\text{If } \underset{i=1 \sim N}{n}(d(x_i, y) < T_3) \geq 2 \text{ and } (d(\tilde{x}, y) < T_3), \quad \text{[Equation 3]}$$

then y is enrollment update candidate

In Equation 3, y denotes a first feature vector, $x_i$, denotes an i-th second feature vector, N denotes a number of second feature vectors, and $\tilde{x}$ denotes a representative vector. $d(x_i, y)$ denotes a distance between the first feature vector y and the i-th second feature vector $x_i$, and $d(\tilde{x}, y)$ denotes a distance between the first feature vector y and the representative vector $\tilde{x}$.

Based on Equation 3, among N second feature vectors, when a number of second feature vectors of which a distance with the first feature vector y is less than a threshold value $T_3$ is greater than or equal to 2 and a distance between the first feature vector y and the representative vector $\tilde{x}$ is less than the threshold value $T_3$, the first feature vector may be determined to be an enrollment update candidate other than the outlier.

When the input image Y is determined to be the outlier, the updating apparatus may terminate the operation without enrolling the input image Y in the enrollment database 405.

When the input image Y is determined not to be the outlier, the updating apparatus may enroll the input image Y as the initial enrollment image based on a comparison result between a number n of the enrollment images and a number of preset initial enrollment images. In operation 430, the updating apparatus determines whether the number n of the enrollment images enrolled in the enrollment database 405 is less than the number of the preset initial enrollment images. When the number n of the enrollment images is less than the number of the preset initial enrollment images, the updating apparatus may enroll the input image Y as the initial enrollment image in operation 435. The initial enrollment image may be stored in the enrollment database 405.

When the number n of the enrollment images is not less than the number of the preset initial enrollment images, the updating apparatus may determine whether the number n of the enrollment images is equal to the number of the preset initial enrollment images in operation 440. When the number n of the enrollment images is equal to the number of the preset initial enrollment images, the updating apparatus may determine the representative vector using the initial enrollment images enrolled in operation 445. The updating apparatus may determine a feature vector of any one of the initial enrollment images as the representative vector. The representative vector may be stored in the enrollment database 405.

Based on a determination that the number n of the enrollment images is not equal to the number of the preset initial enrollment images in operation 440, the updating apparatus may compare the number n of the enrollment images enrolled in the enrollment database 405 to a maximum enrollment number N of the enrollment database 405, in operation 450. The maximum enrollment number N may be a preset value, for example, 30.

In operation 455, when the number n of the enrollment images is less than the maximum enrollment number N, the updating apparatus may add the input image Y to the enrollment database 405.

In operation 460, when the number n of the enrollment images is greater than or equal to the maximum enrollment number N, the updating apparatus determines whether a feature range of the enrollment database 405 is extended by the input image Y. A method of determining whether the feature range of the enrollment database 405 is extended by the input image Y will be described with reference to FIG. 6. When the feature range of the enrollment database is determined not to be extended by the input image Y, the updating apparatus may terminate an operation without enrolling the input image Y in the enrollment database 405. When the feature range of the enrollment database is determined to be extended by the input image Y, the updating apparatus replaces the input image Y with any one of the remaining enrollment images excluding the initial enrollment images included in the enrollment images enrolled in the enrollment database 405 in operation 465. In an example, the updating apparatus may determine whether the input image Y is the enrollment update candidate of the enrollment database 405 using Equation 4.

$$\text{Let } x_{N+1} = y \quad \text{[Equation 4]}$$

$$S_i = \sum_{j=1}^{N+1} d(x_i, x_j) \text{ for } i = 1, \ldots, N+1$$

$$i_{min} = \arg\min_i S_i$$

$$\text{If } N_{init} + 1 \leq i_{min} \leq N, \text{ then enroll } y$$

In more detail, the updating apparatus may set the first feature vector y as an N+1-th second feature vector $x_{N+1}$.

The updating apparatus may calculate an accumulation feature distance $S_i$ corresponding to each of N+1 second feature vectors. When an index $i_{min}$ of a minimum accumulation feature distance corresponding to the second feature vectors of the remaining enrollment images excluding the initial enrollment images $N_{init}$ among accumulation feature distances is less than or equal to N, the updating apparatus may replace the $i_{min}$-th image with the input image Y. When the input image Y has the minimum accumulation feature distance, the updating apparatus may not perform replacing. When a remaining enrollment image excluding the initial enrollment images has the minimum accumulation feature distance, the updating apparatus may replace the corresponding enrollment image with the input image Y.

In an example, when the input image Y is not the outlier and the input image Y extends the feature range, for example, an authentication range, of the enrollment images, the input image Y may be replaced with the remaining enrollment image excluding the initial enrollment images to secure a diversity of the enrollment images included in the enrollment database 405.

Repeated descriptions will be omitted for increased clarity and conciseness because operation 410 corresponds to operation 110 of FIG. 1, operations 420, 430, 440, 445, 450, and 460 correspond to operation 120 of FIG. 1, and operations 435, 455, and 465 correspond to operation 130 of FIG. 1.

Figure 5A:
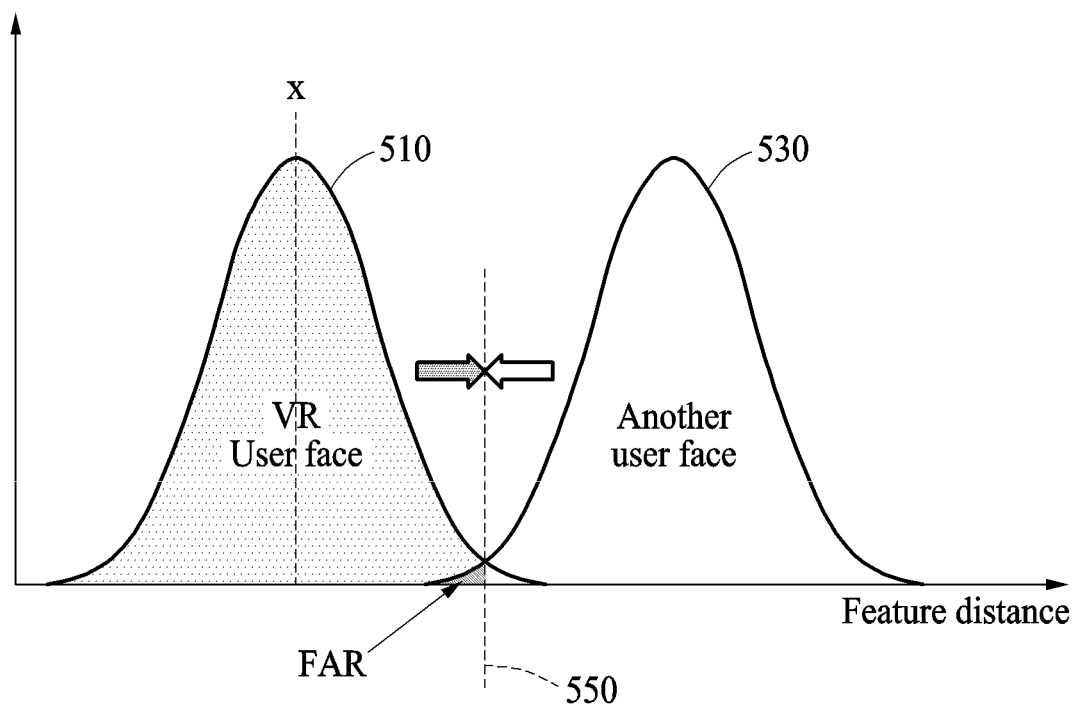
FIGS. 5A and 5B are graphs illustrating a method of determining a threshold according to at least one example embodiment.
Figure 5B:
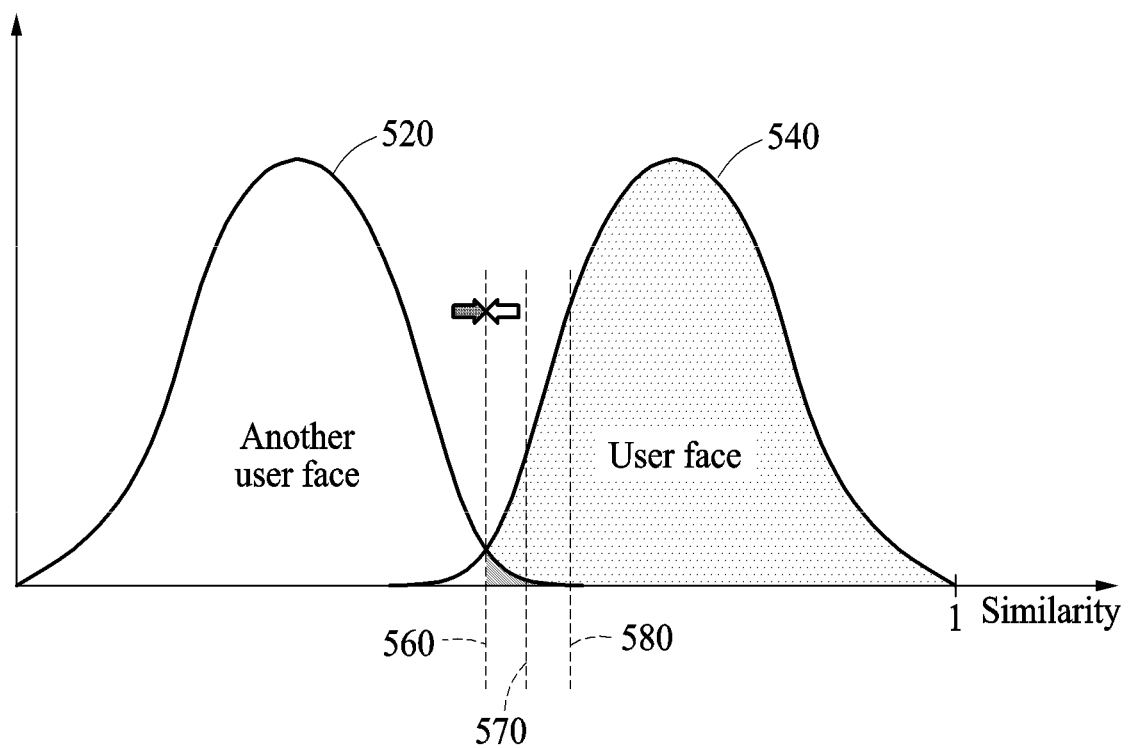

FIGS. 5A and 5B are graphs illustrating a method of determining a threshold according to at least one example embodiment. The threshold may include a threshold distance or a threshold similarity for user authentication, a threshold distance or a threshold similarity for determining an outlier, and a threshold distance or a threshold similarity for adding and/or replacing an input image. The threshold may be determined based on various performance indexes. For example, the threshold may be determined based on a recognition rate, a false acceptance rate (FAR), a false rejection rate (FRR), and various combinations thereof.

Referring to FIG. 5A, a normal distribution curve 510 with respect to feature distances between images of a user and a normal distribution curve 530 with respect to feature distances between images of another user are illustrated. Here, a feature distance may be understood as a distance in inverse proportion to a similarity between images. In the graph of FIG. 5A, an x-axis indicates a feature distance between two images, and a y-axis indicates a value of a probability density function corresponding to the feature distance.

In an example, to set a first threshold distance for the user authentication as a distance corresponding to an FAR of 1%, the updating apparatus may set, as the first threshold distance, a feature distance of a boundary line 550 that differentiate an area of the bottom 1% of an entire area of the normal distribution curve 530 with respect to the feature distances between the images of another user.

Referring to FIG. 5B, a normal distribution curve 520 with respect to similarities between images of another user and a normal distribution curve 540 with respect to similarities between images of the user are illustrated. In the graph of FIG. 5B, an x-axis indicates a similarity ($-1 \leq x \leq 1$) between two images, and a y-axis indicates a value of a probability density function corresponding to the similarity.

In another example, to set a first threshold similarity for user authentication as a similarity corresponding to the FAR of 1%, the updating apparatus may set, as the first threshold similarity, a similarity of a boundary line 560 that differentiates an area of the bottom 1% of an entire area of the normal distribution curve 520 with respect to the similarity between the images of another user.

The updating apparatus may determine a second threshold similarity for adding the input image more strictly than the first threshold similarity. In addition, the updating apparatus may determine a third threshold similarity for replacing the input image more strictly than the second threshold similarity. In an example, the updating apparatus may set a similarity of a boundary line 570 corresponding to the FAR of 0.01% as the second threshold similarity, and set a similarity of a boundary line 580 corresponding to the FAR of 0.001% as the third threshold similarity.

Figure 6A:
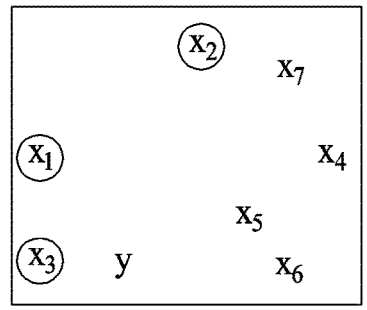
FIGS. 6A through 6C illustrate a method of determining whether a feature range of an enrollment database is extended by an input image according to at least one example embodiment.
Figure 6B:
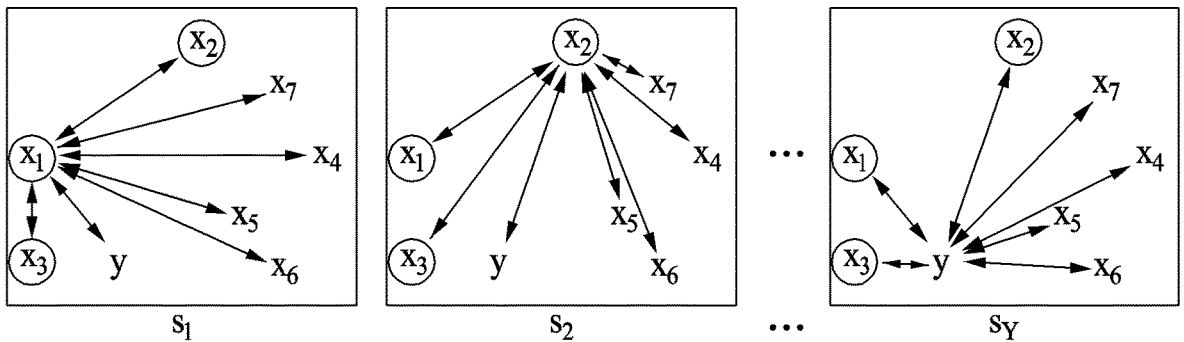
Figure 6C:
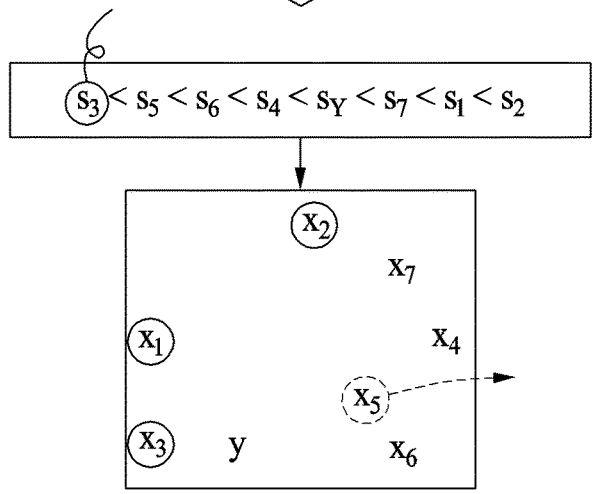

FIGS. 6A through 6C illustrate a method of determining whether a feature range of an enrollment database is extended by an input image according to at least one example embodiment. FIG. 6A illustrates a first feature vector y of an input image and a vector set including second feature vectors $x_1, x_2, x_3, x_4, x_5, x_6$, and $x_7$ of enrollment images including initial enrollment images when the input image is received. The second feature vectors $x_1, x_2$, and $x_3$ represented in circles among the second feature vectors $x_1, x_2, x_3, x_4, x_5, x_6$, and $x_7$ may correspond to feature vectors of the initial enrollment images.

An updating apparatus may determine an accumulation feature distance s corresponding to each vector as illustrated in FIG. 6B based on a sum of distances between any one vector and remaining vectors in the vector set as illustrated in FIG. 6A. For example, the updating apparatus may determine an accumulation feature distance $s_1$ corresponding to the second feature vector $x_1$ by adding up a distance between the second feature vector $x_1$ and a first feature vector y, and distances between the second feature vector $x_1$ and each of the remaining feature vectors $x_2, x_3, x_4, x_5, x_6$, and $x_7$. Based on the foregoing method, the updating apparatus may determine an accumulation feature distance $s_y$ corresponding to the first feature vector y, and accumulation feature distances $s_2, s_3, s_4, x_5, x_6$, and $x_7$ corresponding to the remaining second feature vectors $x_2, x_3, x_4, x_5, x_6$, and $x_7$, respectively.

The updating apparatus may determine whether the accumulation feature distance $s_y$ corresponding to the first feature vector y is greater than at least one of the accumulation feature distances $s_4, s_5, s_6$, and $s_7$ corresponding to the second feature vectors $x_4, x_5, x_6$, and $x_7$ of remaining enrollment images excluding the initial enrollment images. The updating apparatus may replace a remaining enrollment image with an input image when the accumulation feature distance $s_y$ corresponding to the first feature vector y is greater than at least one of the accumulation feature distances $s_4, s_5, s_6$, and $s_7$ corresponding to the second feature vectors $x_4, x_5, x_6$, and $x_7$ of the remaining enrollment images excluding the initial enrollment images. The updating apparatus may replace, with the input image, an enrollment image corresponding to a second feature vector having a minimum accumulation feature distance among the accumulation feature distances $s_4, s_5, s_6$, and $s_7$ of the remaining enrollment images excluding the initial enrollment images.

For example, when lengths of the accumulation feature distances $s_1, s_2, s_3, s_4$, and $s_5$ of each feature vector are $S_3 < S_5 < S_6 < S_4 < S_y < S_7 < S_1 < S_2$, the accumulation feature distance $s_y$ corresponding to the first feature vector y may be greater than the accumulation feature distances $S_3, S_5, S_6$, and $S_4$ corresponding to the second feature vectors $x_3, x_5, x_6$, and $x_4$. The updating apparatus may replace, with the input image, any one of enrollment images corresponding to the second feature vectors $x_5, x_6$, and $x_4$ having the accumulation feature distances $s_5, s_6$, and $s_4$ of the remaining enrollment images excluding the initial enrollment images. The updating apparatus may replace, with the input image, an enrollment image corresponding to the second feature vector $x_5$ having the minimum accumulation feature distance $s_5$. A result of replacing the enrollment image corresponding to the second feature vector $x_5$ by the input image is illustrated in FIG. 6C.

The updating apparatus may replace and compare the feature distances of the input image and enrollment images such that the feature distances between the enrollment images may be increased. Thus, a recognition rate with respect to variously changed input images may be enhanced while limiting a significant change in an authentication area caused by iterative replacement by excluding the initial enrollment images from the replacement.

Figure 7:
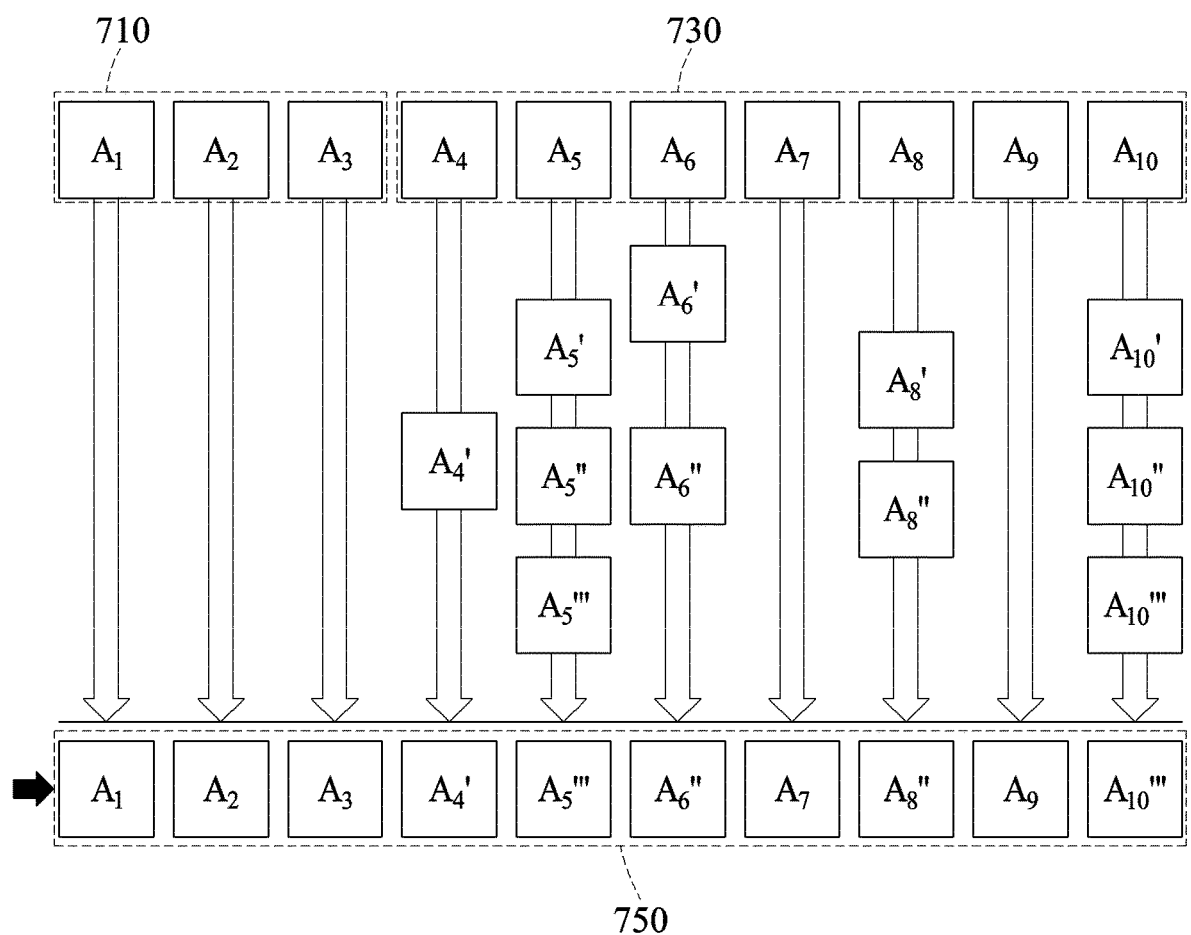
FIG. 7 illustrates adaptively updated enrollment images in an enrollment database according to at least one example embodiment.

FIG. 7 illustrates adaptively updated enrollment images in an enrollment database according to at least one example embodiment.

FIG. 7 illustrates initial enrollment image $A_1, A_2$, and $A_3$, 710, and added seven enrollment images $A_4, A_5, A_6, A_7, A_8, A_9$, and $A_{10}$ 730, and ten enrollment images $A_1, A_2, A_3, A_4', A_5''', A_6'', A_7, A_8'', A_9$, and $A_{10}'''$ 750 that are finally replaced. In FIG. 7, $A_5'$ indicates an image replaced once to correspond to the initial enrollment image $A_5$, $A_5''$ indicates an image replaced twice, and $A_5'''$ indicates an image replaced three times.

In an example, authentication performance with respect to variously changed face images may be enhanced by maintaining feature distances between enrollment images to be relatively wide by adding and replacing the enrollment images. Also, the initial enrollment images may be excluded from the replacement such that an authentication area of a user is limited from being extended to an authentication area of another user.

Figure 8:
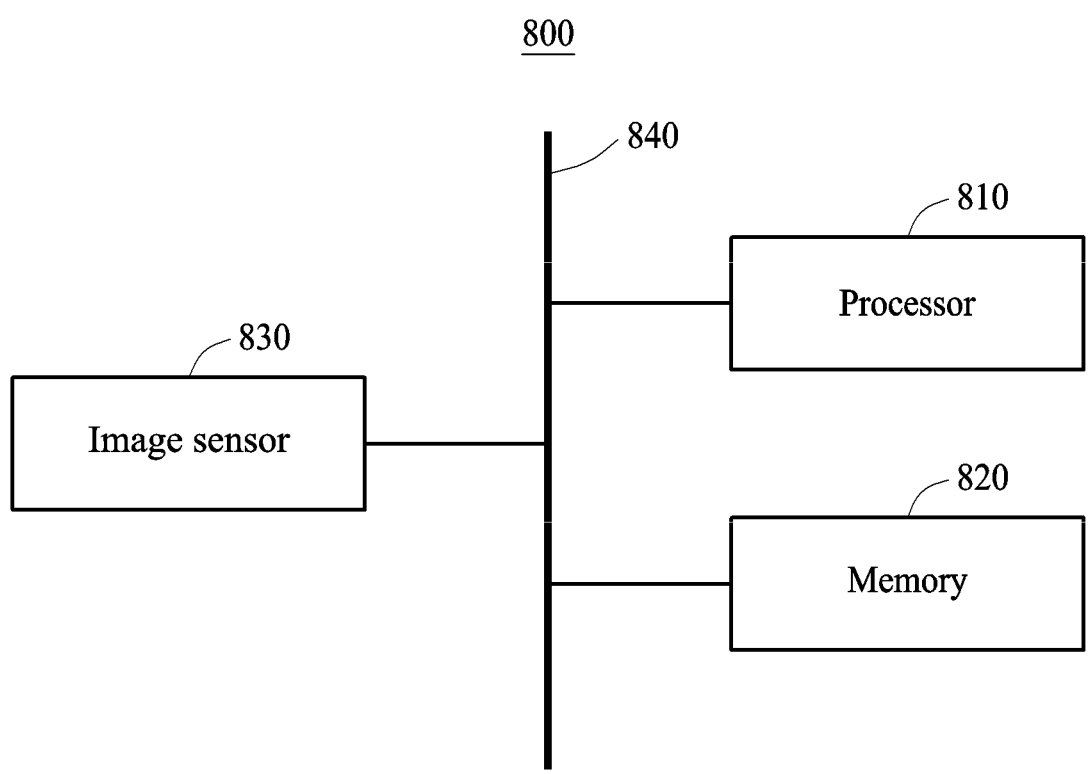
FIG. 8 is a block diagram illustrating an adaptive updating apparatus of an enrollment database according to at least one example embodiment.

FIG. 8 is a block diagram illustrating an example of an adaptive updating apparatus of an enrollment database according to at least one example embodiment. Referring to FIG. 8, an updating apparatus 800 includes a processor 810, a memory 820, and an image sensor 830. The processor 810, the memory 820, and the image sensor 830 may communicate with each other through a bus 840.

The processor 810 adaptively updates an enrollment database using pre-enrolled enrollment images and an input image of a user. The input image of the user may be an image including various user body portions, for example, a face, an iris, and a fingerprint of the user.

The processor 810 extracts a first feature vector from the input image of the user. The processor 810 determines whether the input image is to be enrolled in the enrollment database based on the first feature vector, second feature vectors of the enrollment images including initial enrollment images enrolled in the enrollment database, and a representative vector representing the initial enrollment images. The processor 810 enrolls the input image in the enrollment database based on a result of the determining.

The processor 810 determines at least one of whether the input image is an outlier based on the first feature vector, the second feature vectors, and the representative vector and whether a feature range of the enrollment database is extended based on the first feature vector and the second feature vectors. When the input image is not the outlier and a number of the enrollment images is less than a maximum enrollment number, the processor 810 adds the input image to the enrollment database. When the number of the enrollment images is greater than or equal to the maximum enrollment number, the processor 810 additionally determines whether the feature range of the enrollment database is extended. When the feature range is extended, the processor 810 replaces the input image with any one of the enrollment images excluding the initial enrollment images.

The processor 810 may perform at least one of the methods described with reference to FIGS. 1 through 7.

The processor 810 executes a program and controls the updating apparatus 800. A program code executed by the processor 810 may be stored in the memory 820. The updating apparatus 800 may be connected to an external device, for example, a personal computer or a network, through an input and output device (not shown), and may exchange data.

The memory 820 stores the enrollment database including the pre-enrolled enrollment images. The memory 820 includes the first feature vector, the second feature vectors of the enrollment images including the initial enrollment images, and the representative vector representing the initial enrollment images extracted from the input image. The memory 820 stores a newly enrolled input image. The memory 820 may be a volatile memory or a non-volatile memory. The image sensor 830 captures the input image including the face of the user.

The updating apparatus 800 may be provided as a software module to be driven by at least one processor. The software module may be recorded, in a program form, in a memory connected to a processor. Alternatively, the updating apparatus 800 may be provided in a hardware module. Alternatively, the updating apparatus 800 may be provided in a combination of the software module and the hardware module. A function provided by the software module may be performed by a processor, and a function provided by the hardware module may be performed by a corresponding hardware. The processor and the hardware may interchange a signal through an input and output bus.

The updating apparatus 800 may include a mobile device such as a mobile phone, a smartphone, a PDA, a tablet computer, a laptop computer, and the like, a computing device such as a personal computer, the tablet computer, a netbook, and the like, and various electronic systems such as a TV, a smart TV, a security device for a gate control, and the like.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An adaptive updating method of an enrollment database, the method comprising:
    extracting a first feature vector from an input image of a user;
    determining whether the input image is to be enrolled in the enrollment database based on the first feature vector, second feature vectors of enrollment images including initial enrollment images enrolled in the enrollment database, and a representative vector determined through statistical calculation of the second feature vectors of the initial enrollment images; and
    enrolling the input image in the enrollment database based on a result of the determining.

2. The method of claim 1, wherein the determining of whether the input image is to be enrolled comprises at least one of:
   determining whether the input image is an outlier based on the first feature vector, the second feature vectors, and the representative vector; and
   determining whether a feature range of the enrollment database is extended based on the first feature vector and the second feature vectors.

3. The method of claim 2, wherein the determining of whether the input image is the outlier comprises:
   calculating a minimum distance between the first feature vector and the second feature vectors;
   calculating a representative distance between the first feature vector and the representative vector; and
   determining whether the input image is the outlier based on the minimum distance and the representative distance.

4. The method of claim 3, wherein the determining of whether the input image is the outlier determines whether the input image is the outlier based on whether the minimum distance is less than a first preset threshold and whether the representative distance is less than a second preset threshold, and the first preset threshold and the second preset threshold are for an update of the enrollment database.

5. The method of claim 2, wherein the determining of whether the feature range of the enrollment database is extended comprises:
   determining an accumulation feature distance corresponding to each vector in a vector set comprising the first feature vector and the second feature vectors, the accumulation feature distance determined based on distances between the corresponding vector and remaining vectors in the vector set; and
   determining whether the accumulation feature distance corresponding to the first feature vector is greater than at least one of the accumulation feature distances corresponding to the second feature vectors of remaining enrollment images excluding the initial enrollment images.

6. The method of claim 5, wherein the enrolling of the input image in the enrollment database comprises:
   replacing one enrollment image among the remaining enrollment images with the input image when the accumulation feature distance corresponding to the first feature vector is greater than the at least one of the accumulation feature distances corresponding to the second feature vectors of the remaining enrollment images.

7. The method of claim 6, wherein the replacing of the one enrollment image with the input image replaces, with the input image, a remaining enrollment image corresponding to a second feature vector having a minimum accumulation feature distance among the accumulation feature distances.

8. The method of claim 1, wherein the enrolling of the input image comprises:
   enrolling the input image as one of the initial enrollment images based on a result of determination whether the input image is an outlier, and a first comparison result between a number of the enrollment images and a number of preset initial enrollment images.

9. The method of claim 8, wherein the enrolling of the input image in the enrollment database comprises:
   enrolling the input image as one of the initial enrollment images based on the result of the determination that the input image is not the outlier and the first comparison result that the number of the enrollment images is less than the number of the preset initial enrollment images; and
   determining the representative vector using the initial enrollment images based on the result of the determination that the input image is not the outlier and the first comparison result that the number of the enrollment images is equal to the number of the preset initial enrollment images.

10. The method of claim 8, wherein the enrolling of the input image in the enrollment database comprises at least one of:
    based on the result of the determination whether the input image is the outlier, the first comparison result, and a second comparison result between the number of enrollment images and a maximum enrollment number of the enrollment database,
    adding the input image to the enrollment database; and
    replacing one of remaining enrollment images excluding the initial enrollment images included in the enrollment images with the input image.

11. The method of claim 10, wherein the adding of the input image to the enrollment database comprises:
    adding the input image to the enrollment database when the input image is not the outlier, the number of the enrollment images is greater than the number of the preset initial enrollment images, and the number of the enrollment images is less than the maximum enrollment number of the enrollment database.

12. The method of claim 10, wherein the replacing of the one enrollment image with the input image comprises:
    replacing the one of the remaining enrollment images excluding the initial enrollment images included in the enrollment images with the input image when the input image is not the outlier, the number of the enrollment images is greater than the number of the preset initial enrollment images, and the number of the enrollment images is greater than or equal to the maximum enrollment number of the enrollment database.

13. The method of claim 1, wherein the determining of whether the input image is to be enrolled comprises:
    authenticating the user based on the first feature vector, the second feature vectors, and the representative vector.

14. The method of claim 13, wherein the authenticating of the user comprises:
    calculating a minimum distance between the first feature vector and the second feature vectors;
    calculating a representative distance between the first feature vector and the representative vector; and
    authenticating the user based on a result of a comparison of a minimum value of the minimum distance and the representative distance to a preset threshold for a user authentication.

15. The method of claim 14, wherein the determining of whether the input image is to be enrolled comprises determining whether the input image is to be enrolled in the enrollment database based on whether the authenticating of the user succeeds or fails.

16. A non-transitory computer-readable medium comprising program code that, when executed by a processor, executes an adaptive updating method of an enrollment database, the method comprising:
    extracting a first feature vector from an input image of a user:
    determining whether the input image is to be enrolled in the enrollment database based on the first feature vector, second feature vectors of enrollment images including initial enrollment images enrolled in the enrollment database, and a representative vector determined through statistical calculation of the second feature vectors of the initial enrollment images; and enrolling the input image in the enrollment database based on a result of the determining.

17. An adaptive updating apparatus of an enrollment database, the apparatus comprising:

a memory configured to store the enrollment database; and a processor configured to cause the adaptive updating apparatus to extract a first feature vector from an input image of a user and enroll the input image by determining whether the input image is to be enrolled in the enrollment database based on the first feature vector, second vectors of enrollment images including initial enrollment images enrolled in the enrollment database, and a representative vector determined through statistical calculation of the second feature vectors of the initial enrollment images.

18. The adaptive updating apparatus of claim 17, wherein the processor is configured to cause the adaptive updating apparatus to determine at least one of whether the input image is an outlier based on the first feature vector, the second feature vectors, and the representative vector and whether a feature range of the enrollment database is extended based on the first feature vector and the second feature vectors.

19. The adaptive updating apparatus of claim 18, wherein the processor is configured to cause the adaptive updating apparatus to calculate a minimum distance between the first feature vector and the second feature vectors, calculate a representative distance between the first feature vector and the representative vector, and determine whether the input image is the outlier based on the minimum distance and the representative distance.

20. The adaptive updating apparatus of claim 18, wherein the processor is configured to cause the adaptive updating apparatus to determine an accumulation feature distance corresponding to each vector in a vector set comprising the first feature vector and the second feature vectors, the accumulation feature distance is determined based on distances between the corresponding vector and remaining vectors in the vector set, and determine whether the feature range of the enrollment database is extended based on whether the accumulation feature distance corresponding to the first feature vector is greater than at least one of the accumulation feature distances corresponding to the second feature vectors of remaining enrollment images excluding the initial enrollment images.

21. The adaptive updating apparatus of claim 20, wherein the processor is configured to cause the adaptive updating apparatus to replace, with the input image, a remaining enrollment image corresponding to a second feature vector having a minimum accumulation feature distance among the enrollment images when the accumulation feature distance corresponding to the first feature vector is greater than the at least one of the accumulation feature distances corresponding to the second feature vectors of the remaining enrollment images, based on a result of the determining.

22. The adaptive updating apparatus of claim 17, wherein the processor is configured to cause the adaptive updating apparatus to enroll the input image as one of the initial enrollment images when the input image is not an outlier and a number of the enrollment images is less than a number of preset initial enrollment images, and determine the representative vector using the initial enrollment images when the input image is not the outlier and the number of the enrollment images is equal to the number of the preset initial enrollment images.

23. The adaptive updating apparatus of claim 22, wherein the processor is configured to cause the adaptive updating apparatus to add the input image to the enrollment database when the input image is not the outlier, the number of the enrollment images is greater than the number of the preset initial enrollment images, and the number of the enrollment images is less than a maximum enrollment number of the enrollment database, and replace one of remaining enrollment images excluding the initial enrollment images included in the enrollment images with the input image when the input image is not the outlier, the number of the enrollment images is greater than the number of the preset initial enrollment images, and the number of the enrollment images is greater than or equal to the maximum enrollment number of the enrollment database.

24. The adaptive updating apparatus of claim 17, wherein the processor is configured to cause the adaptive updating apparatus to authenticate the user based on the first feature vector, the second feature vectors, and the representative vector and determine whether the input image is to be enrolled in the enrollment database based on whether the authenticating of the user succeeds or fails.

25. An adaptive updating method of an enrollment database, the method comprising:

authenticating an input image;

determining whether the input image is an outlier based on a representative vector determined through statistical calculation of feature vectors of initial enrollment images;

determining whether a feature range of the enrollment database including enrollment images is extended by the input image; and replacing one of remaining enrollment images excluding the initial enrollment images included in the enrollment images with the input image.

26. The method of claim 25, wherein the determining of whether the input image is the outlier comprises:

calculating a minimum distance between a first feature vector extracted from the input image and second feature vectors extracted from the enrollment images in the enrollment database;

calculating a representative distance between the first feature vector and the, representative vector, the representative vector representing the initial enrollment images; and determining whether a first condition associated with the minimum distance and a second condition associated with the representative distance are satisfied.

27. The method of claim 25, wherein the determining of whether the feature range of the enrollment database is extended by the input image comprises:

calculating an accumulation feature distance corresponding to each vector in a vector set comprising a first feature vector extracted from the input image and second feature vectors extracted from the enrollment images in the enrollment database; and determining whether an accumulation feature distance corresponding to the first feature vector is greater than at least one of accumulation feature distances corresponding to the second feature vectors of the remaining enrollment images excluding the initial enrollment images.

28. The method of claim 27, wherein the calculating of the accumulation feature distance corresponding to each vector comprises adding up, to correspond to each vector, distances between the vector and remaining vectors in the vector set.

29. An adaptive updating apparatus of an enrollment database, the apparatus comprising:
- a processor configured to cause the adaptive updating apparatus to authenticate an input image based on enrollment database in which enrollment images including initial enrollment images are enrolled, determine whether the input image is an outlier based on a representative vector determined through statistical calculation of feature vectors of the initial enrollment images, and adaptively update the enrollment database based on a result of the authenticating and a result of the determining.

30. The adaptive updating apparatus of claim 29, wherein, to determine whether the input image is the outlier, the processor is configured to cause the adaptive updating apparatus to calculate a minimum distance between a first feature vector extracted from the input image and second feature vectors extracted from the enrollment images in the enrolment database, calculate a representative distance between the first feature vector and the representative vector, and determine whether a first condition associated with the minimum distance and a second condition associated with the representative distance are satisfied.

* * * * *